(12) United States Patent
McCarthy et al.

(10) Patent No.: US 7,424,911 B2
(45) Date of Patent: Sep. 16, 2008

(54) METHOD OF ESTIMATING FRACTURE GEOMETRY, COMPOSITIONS AND ARTICLES USED FOR THE SAME

(75) Inventors: Scott M. McCarthy, Fulshear, TX (US); Robert R. McDaniel, Houston, TX (US); Michael L. Sheriff, Plano, TX (US); James E. Flowers, Dallas, TX (US)

(73) Assignee: Hexion Specialty Chemicals, Inc., Columbus, OH (US)

( * ) Notice: Subject to any disclaimer, the term of this patent is extended or adjusted under 35 U.S.C. 154(b) by 276 days.

(21) Appl. No.: 11/242,745

(22) Filed: Oct. 4, 2005

(65) Prior Publication Data

US 2006/0102345 A1    May 18, 2006

Related U.S. Application Data (60) Provisional application No. 60/615,835, filed on Oct. 4, 2004, provisional application No. 60/643,850, filed on Jan. 14, 2005.

(51) Int. Cl.
*E21B 47/00* (2006.01)

(52) U.S. Cl. .............. 166/250.12; 166/250.1; 166/280.1; 166/280.2

(58) Field of Classification Search .............. 166/250.1, 166/280.1, 280.2, 250.12
See application file for complete search history.

(56) References Cited

U.S. PATENT DOCUMENTS

| | | | |
|---|---|---|---|
| 4,491,796 A | 1/1985 | Smith | |
| 5,417,103 A | 5/1995 | Hunter et al. | |
| 5,439,055 A | 8/1995 | Card et al. | |
| 6,172,011 B1 | 1/2001 | Card et al. | |
| 6,581,686 B2 | 6/2003 | Armatage | |
| 6,725,930 B2 | 4/2004 | Boney et al. | |
| 2003/0196805 A1 | 10/2003 | Boney et al. | |
| 2003/0205376 A1 | 11/2003 | Ayoub et al. | |
| 2004/0147388 A1* | 7/2004 | Webber et al. | 501/128 |
| 2005/0274510 A1* | 12/2005 | Nguyen et al. | 166/250.12 |
| 2006/0078682 A1* | 4/2006 | McDaniel et al. | 427/372.2 |

FOREIGN PATENT DOCUMENTS

| | | |
|---|---|---|
| GB | 2352259 A | 1/2001 |
| WO | WO 03/089757 A1 | 10/2003 |

* cited by examiner

*Primary Examiner*—Giovanna C Wright (57) ABSTRACT

Disclosed herein is a method of determining the fracture geometry of a subterranean fracture comprising introducing into the fracture a target particle and/or proppant; transmitting into the fracture electromagnetic radiation having a frequency of about 300 megahertz to about 100 gigahertz; and analyzing a reflected signal from the target particle to determine fracture geometry. Disclosed herein too is a method of determining the fracture geometry of a subterranean fracture comprising introducing into the fracture a target particle and/or proppant; wherein the target particle and/or proppant comprises a high dielectric constant ceramic having a dielectric constant of greater than or equal to about 2; transmitting into the fracture electromagnetic radiation having a frequency of less than or equal to about 3 gigahertz; and analyzing a reflected signal from the target particle and/or proppant to determine fracture geometry.

17 Claims, 1 Drawing Sheet

Fig. 1

METHOD OF ESTIMATING FRACTURE GEOMETRY, COMPOSITIONS AND ARTICLES USED FOR THE SAME

CROSS REFERENCE TO RELATED APPLICATIONS

This application claims the benefit of U.S. Provisional Application Ser. No. 60/615,835 filed Oct. 10, 2004, as well as U.S. Provisional Application Ser. No. 60/643,850 filed Jan. 14, 2005, the entire contents of which are hereby incorporated by reference.

BACKGROUND

This disclosure relates to methods for estimating fracture geometry and to articles used to facilitate the same. In particular the disclosure relates to methods for estimating the length and height of the fracture.

In the completion of wells drilled into the earth, a string of casing is normally run into the well and a cement slurry is flowed into the annulus between the casing string and the wall of the well. The cement slurry is allowed to set and form a cement sheath, which bonds the string of casing to the wall of the well. Perforations are provided through the casing and cement sheath adjacent the subsurface formation. Fluids, such as oil or gas, are produced through these perforations into the well.

It is oftentimes desirable to treat subterranean formations in order to increase the production from the well. For example, in the oil industry subterranean formations are hydraulically fractured in order to facilitate the flow of oil and/or gas into the well or the injection of fluids such as gas or water from the well into the formation. Such hydraulic fracturing is accomplished by disposing a suitable fracturing fluid within the well opposite the formation to be treated. Thereafter, sufficient pressure is applied to the fracturing fluid in order to cause the formation to break down with the attendant formation of one or more fractures therein. Simultaneously with or subsequent to the formation of the fracture, a suitable carrier fluid having suspended therein a propping agent or proppant such as sand or other particulate material is introduced into the fracture. The proppant is deposited in the fracture and functions to hold the fracture open after the fluid pressure is released. The fluid containing the proppant is of a relatively high viscosity in order to generate a wider fracture width and reduce the tendency of the propping agent to settle out of the fluid as it is injected down the well and out into the formation. High viscosity fluids increase the fracture width and allows more proppant to be transported into the fracture. It also helps control leak-off of the fracturing fluid into the walls of the fracture being created.

Certain aspects of the extent of such formation fracturing and the location of proppant materials has been ascertained by the use of radioactive tracers. The radioactive tracers have been plated or coated on propping agents or added as a liquid and injected along with the fracturing fluid. These coatings generally contain radioactive isotopes. Although the use of such radioactive tracers or coatings yields useful information, its usefulness is limited to fracture locations near the wellbore and yields little if any useful information relating to the dimensions of the fracture as it extends into the formation. The use of radioactive tracers also presents monitoring, logistical and environmental problems. The short half-lives of such tracers prevent the monitoring of the movement of such tracers in the formation fractures other than over a short time interval. Transportation and use of radioisotopes is expensive and government regulations or restrictions must be accommodated. Disposal of excess radioactive proppants can be a problem, especially in offshore operations.

It is therefore desirable to develop a method for hydraulic fracturing in which the extent of such fracturing is measured without the use of radioactive isotope tracers. It is also desirable to determine the geometry of the formation fracture and in particular the penetration or length of the fracture that extends out from the wellbore.

SUMMARY

Disclosed herein is a method of determining the fracture geometry of a subterranean fracture comprising introducing into the fracture a target particle and/or proppant; transmitting into the fracture electromagnetic radiation having a frequency of about 300 megahertz to about 100 gigahertz; and analyzing a reflected signal to determine fracture geometry.

Disclosed herein too is a method of determining the fracture geometry of a subterranean fracture comprising introducing into the fracture a target particle and/or proppant; wherein the target particle and/or proppant comprises a high dielectric constant ceramic having a dielectric constant of greater than or equal to about 2; transmitting into the fracture electromagnetic radiation having a frequency of less than or equal to about 3 gigahertz; and analyzing a reflected signal from the target particle or a fracture surface to determine fracture geometry.

Disclosed herein too is a proppant comprising a metallic or inorganic oxide substrate; and a coating disposed upon the metallic or inorganic oxide substrate; wherein the proppant has a dielectric constant of greater than or equal to about 2.

Disclosed herein too is a method of manufacturing a proppant comprising disposing a coating upon a metallic or inorganic oxide substrate; wherein an addition of the coating to the substrate increases the dielectric constant of the proppant to an amount of greater than or equal to about 2.

DETAILED DESCRIPTION

Disclosed herein is a method for determining the fracture geometry and dimensions of a subterranean fracture made for purposes or recovering resources from the earth. Such resources include oil and natural gas, water, minerals, or the like. The fracture geometry includes the fracture length and/or the fracture height. The method advantageously uses frequencies of about 300 megahertz (MHz) to about 100 (gigahertz) GHz, or any portion thereof, in the electromagnetic spectrum to obtain information about the fracture geometry and the fracture dimensions. In one embodiment, frequencies of less than or equal to about 3 GHz can be effectively transmitted through the proppant disposed in a subterranean fracture and can be advantageously used to determine fracture geometry. The information obtained about the fracture geometry will provide a novel and improved method for well completion or fracture optimization.

The method advantageously employs proppants and particles that have dielectric storage factors (hereinafter dielectric constants) greater than or equal to about 2. In one exemplary embodiment, the particles and proppants have dielectric constants greater than or equal to about 6. In another exemplary embodiment, the particles and proppants have dielectric constants greater than or equal to about 10. In yet another exemplary embodiment, the particles and proppants have dielectric constants greater than or equal to about 20. In yet another exemplary embodiment, the particles and proppants have dielectric constants greater than or equal to about 40.

The method relies on the existence of differing propagation modes for the transmission of electromagnetic waves within the proppant disposed in the fracture as opposed to the propagation modes from the surrounding geologic structures. Normally, the propagation of electromagnetic waves in a rock medium, especially medium containing water content, is strongly attenuated. Varying the properties of the proppant materials that are normally introduced into the fracture to structurally support the fracture can influence the propagation of the electromagnetic waves in the fracture. In this way, the fracture will be transformed into a microwave supporting medium similar to a waveguide but with an irregular shape.

In one embodiment, the method comprises introducing electrically conducting particles (additives and/or fillers that do not prop the fracture) or proppants (particles that are pressure bearing and support the walls of the subterranean fracture) into the fracture and irradiating from a transmitter into the fracture an electromagnetic radiation having frequencies from about 300 MHz to 100 GHz, or any portion thereof. As noted above, frequencies of less than or equal to about 3 GHz are preferable. The electrically conducting particles and proppants are dispersed along the walls of the fracture and behave as a waveguide. The particles and/or proppants that reach the end of the fracture, i.e., the portion of the fracture farthest from the bore hole are called target particles. The particles and/or proppants that contact the walls of the fracture prior to the end of the fracture are termed secondary particles and/or proppants. The electromagnetic radiation is reflected from the electrically conducting particles and/or the target particles and/or the proppant and/or a fracture surface and collected by a receiver. The signal received from the conducting particles and/or proppants is processed in a computer with an attached database to provide information about the geometry of the fracture.

In another embodiment, as noted above, the particles and/or proppants comprise ceramics and have dielectric constants greater than or equal to about 6, more specifically greater than or equal to about 10, more specifically greater than or equal to about 20, even more specifically greater than or equal to about 40. These high dielectric particles and/or proppants comprise a metallic substrate upon which is disposed a ceramic coating having a dielectric constant greater than or equal to about 6. In one embodiment, when particles and/or proppants having a dielectric constant greater than or equal to about 6 are employed in the subterranean fracture, it is desirable to use electromagnetic radiation having a frequency of less than or equal to about 1 GHz.

In another embodiment, the particles and/or proppants can be generated and/or modified in the fracture by reacting a precursor with the particles and/or proppants in the fracture. The precursor is reacted to form electrically conducting, semiconducting or non-conducting particles that, in one embodiment, are deposited on the walls of the fracture. The particles then reflect or absorb electromagnetic radiation that is incident upon them. The reflected radiation is then analyzed and provides information about the fracture geometry upon analysis.

In another embodiment, the particles and/or proppants can absorb the electromagnetic radiation that is incident upon them. The difference in the signal strength received from the reflective particles versus the signal received from the portions of the fracture that contain absorbing particles and/or proppants can be used to determine fracture geometry.

Figure 1:
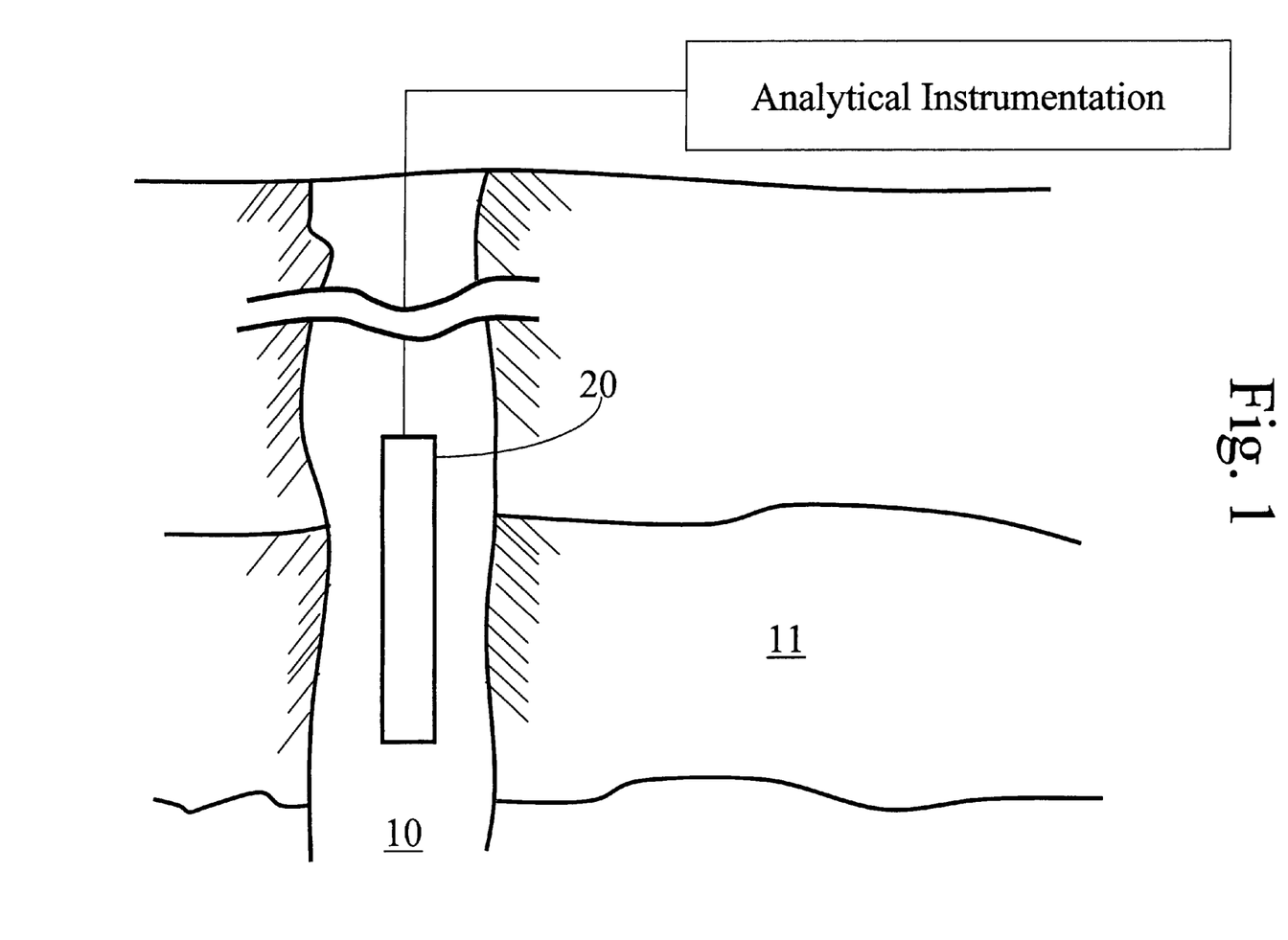
The FIGURE represents an exemplary embodiment of a method of introduction of the logging tool into the bore hole in order to determine fracture geometry.

Referring now to the FIGURE, a borehole 10 penetrates a subsurface formation of interest 11, which is to be hydraulically fractured to facilitate the flow of resources (e.g., oil and/or natural gas) from the formation 11 into the borehole. During the formation of a fracture, a fracturing fluid comprising proppants or particles are introduced into the fracture. Proppants are used to prop open the fracture to permit increased flow (conductivity) of natural resources from the formation into the well. The particles do not play a substantial role in propping open the fracture, but can reflect any incident electromagnetic radiation having a frequency from about 300 MHz to about 100 GHz.

More particularly, a logging tool 20 is lowered into the borehole 10 to a position adjacent to the bottom of formation 11. Logging tool 20 comprises an electromagnetic radiation transmitter and receiver. The logging tool is provided with antennas of a size effective to transmit and to receive electromagnetic radiation having a frequency of about 300 MHz to 100 GHz, or any portion thereof. It is desirable to have a logging tool with antennas of a size effective to transmit and to receive electromagnetic radiation of a frequency of less than or equal to about 3 GHz. In one embodiment, it is desirable to have a logging tool with antennas of a size effective to transmit and to receive electromagnetic radiation of a frequency of less than or equal to about 1 GHz.

The logging tool 20 may also comprise transmitters and receivers that can be used for transmitting and receiving other electromagnetic frequencies that are outside the 300 MHz to 100 GHz range. The logging tool can also contain equipment such as ultrasonic equipment, x-ray equipment, and infrared equipment to transmit and to receive data from other sources that facilitate a determination of fracture geometry. The logging tool can also include a gyroscope that would allow the direction of a signal to be determined. The determination of the direction of an electromagnetic radiation signal permits a determination of the direction of the fracture.

The logging tool 20 is raised so as to traverse the formation 11 from bottom to top. The logging tool is also rotated in the borehole 10 to detect the location of the fracture. During such traversal and/or rotation, the logging tool transmits electromagnetic radiation having a frequency from 300 MHz to 100 GHz, or any portion thereof, into the formation 11. The electromagnetic radiation can be advantageously pulsed into fracture from the logging tool 20. The receiver collects electromagnetic radiation signals from the proppants, particles, walls of the fracture or other fracture surfaces and transmits these uphole to a computer that can analyze the signals and with the help of software develop an image of the fracture. The image of the fracture would provide data pertaining to the length and the height of the fracture (and azimuth or direction).

Table 1 provides information about the different bands as classified by the IEEE (Institute of Electrical and Electronic Engineers) that may be used in the determination of the fracture geometry.

TABLE 1

| Designation | Frequency range in GHz |
| --- | --- |
| HF | 0.003-0.030 |
| VHF | 0.030-0.300 |
| UHF | 0.300-1.000 |
| L band | 1.000-2.000 |
| S band | 2.000-4.000 |

TABLE 1-continued

| Designation | Frequency range in GHz |
|---|---|
| C band | 4.000-8.000 |
| X band | 8.000-12.000 |
| $K_u$ band | 12.000-18.000 |
| K band | 18.000-27.000 |
| $K_a$ band | 27.000-40.000 |
| Millimeter | 40.000-300.000 |
| Submillimeter | >300.000 |

In one embodiment, exemplary frequencies that may be used for imaging the fracture from about the L band to about the Ka band. In another embodiment, exemplary frequencies that may be used for imaging the fracture are from about the UHF band to about the S band.

A variety of additives and/or fillers can be used for determining the geometry of the fracture. The additives and/or fillers (hereinafter additives and/or fillers will be termed "particles") can be electrically conducting, semi-conducting or electrically non-conducting. Electrically conducting particles can be used for reflecting the electromagnetic radiation signals. Semi-conducting and non-conducting particles can be used to absorb the electromagnetic radiation signals or to propagate them during radar operations and/or imaging operations. The particles and/or proppants can be either electrically conducting, semi-conducting or non-conducting if desired. In an exemplary embodiment, the particles and/or proppants are electrically conducting and can reflect the electromagnetic radiation that it incident upon them. The electrically conducting particles facilitate the transmission of incident and reflected electromagnetic radiation. In another exemplary embodiment, the particles have a high dielectric constant and can facilitate the waveguiding of the radiation signal.

In one embodiment, the semi-conducting and/or non-conducting particles are transparent to the electromagnetic radiation signals, i.e., they permit the electromagnetic radiation signals to pass through without any substantial attenuation. In another embodiment, the semi-conducting and/or non-conducting particles are opaque to the electromagnetic radiation signals, i.e., they completely absorb the electromagnetic radiation signals.

In one embodiment, a combination of semi-conducting, conducting and non-conducting particles and/or proppants may be introduced into the fracture to facilitate the process of developing an image of the fracture. Combinations of different types of particles and/or proppants can be used to improve imaging capabilities of the process. For example, it may be desirable to screen certain sections of the fracture from the electromagnetic radiation signals in order to facilitate imaging of other sections. Different types of particles and/or proppants can be introduced into the fracture either sequentially or simultaneously. When combinations of different types of particles and/or proppants are used, the particles and/or proppants may be mixed together prior to introduction and then introduced into the fracture. In another embodiment, a proportion of conducting particles and/or proppants may be introduced into the fracture prior to introducing a proportion of non-conducting or semi-conducting particles and/or proppants. In yet another embodiment, a proportion of non-conducting particles and/or proppants may be introduced into the fracture prior to introducing a proportion of conducting or semi-conducting particles and/or proppants into the fracture.

Examples of electrically conducting particles are metallic particles, non-conducting particles with metallic coatings, carbonaceous particles, electrically conducting metal oxides, electrically conducting polymer particles, or the like, or a combination comprising at least one of the foregoing particles. Examples of suitable metals that can be used in metallic particles are transition metals, alkaline earth metals, alkali metals, rare earth metals, main group metals, or the like, or a combination comprising at least one of the foregoing metals. Alloys may also be used. Examples of suitable metals are copper, aluminum, steel, iron, brass, nickel, cobalt, silver, or the like, or a combination comprising at least one of the foregoing metals.

Examples of non-conducting particles that can be coated with metals (in order to render them electrically conducting) are polymers such as thermoplastic polymers, thermosetting polymers, ionomers, dendrimers, or the like, or a combination comprising at least one of the foregoing polymers. Examples of suitable polymers are polyolefins, polyamides, polyesters, polyimides, polyacrylates, polymethacrylates, fluoropolymers, liquid crystalline polymers, or the like, or a combination comprising at least one of the foregoing polymers. The polymers are generally electrically insulating but can be made electrically conducting by coating them with a layer of electrically conducting metals. In an exemplary embodiment, the conducting particles and the non-conducting particles with metallic coatings can be magnetic or magnetizable. The magnetic or magnetizable particles are advantageous in that they can form networks or can be made to from networks by the use of a magnetic field or electrical field after being introduced into the fracture. Networks of conducting particles can advantageously reflect the electromagnetic radiation signals incident upon the particles, thereby providing information about the fracture geometry.

When non-conducting particles are coated with metals by disposing a metallic coating is disposed upon a polymeric substrate, it is generally desirable for the coated particles to have a bulk density of about 0.5 to about 4.0 grams per cubic centimeter ($g/cm^3$). In one embodiment, the non-conducting particle coated with metal have a bull density of less than or equal to about 2.0 $g/cm^3$. In another embodiment, the non-conducting particle coated with metal have a bull density of less than or equal to about 1.0 $g/cm^3$. It is desirable for the polymeric substrate to withstand downhole temperatures. In one embodiment, it is desirable for the polymeric substrate to withstand temperatures of up to about 300° C.

Examples of carbonaceous particles are carbon black, coke, graphitic particles, fullerenes, carbon nanotubes such as single wall carbon nanotubes, double wall carbon nanotubes, multiwall carbon nanotubes, or the like, or a combination comprising at least one of the foregoing carbonaceous particles.

Various types of conductive carbon fibers may also be used in order to reflect the electromagnetic radiation. Carbon fibers are generally classified according to their diameter, morphology, and degree of graphitization (morphology and degree of graphitization being interrelated). These characteristics are presently determined by the method used to synthesize the carbon fiber. For example, carbon fibers having diameters down to about 5 micrometers, and graphene ribbons parallel to the fiber axis (in radial, planar, or circumferential arrangements) are produced commercially by pyrolysis of organic precursors in fibrous form, including phenolics, polyacrylonitrile (PAN), or pitch.

The carbon fibers generally have a diameter of about 1,000 nanometers (1 micrometer) to about 30 micrometers. In one embodiment, the carbon fibers generally have a diameter of about 2 micrometer to about 25 micrometers. In another embodiment, the carbon fibers generally have a diameter of about 5 micrometer to about 20 micrometers. In yet another embodiment, the carbon fibers generally have a diameter of about 7 micrometer to about 15 micrometers.

In one embodiment, the carbon fibers have an aspect ratio of greater than or equal to about 3. In another embodiment, the carbon fibers have an aspect ratio of greater than or equal to about 100. In another embodiment, the carbon fibers have an aspect ratio of greater than or equal to about 1,000. In yet another embodiment, the carbon fibers have an aspect ratio of greater than or equal to about 10,000.

In one embodiment, the proppants or particles may comprise ceramic substrates or polymeric substrates that are coated with an electrically conducting coating that comprises polymers, carbon nanotubes and/or carbon black. The electrically conducting coating generally has a bulk resistivity of less than or equal to about $10^5$ ohm-cm. In another embodiment, the electrically conducting coating generally has a bulk resistivity of less than or equal to about $10^3$ ohm-cm.

Examples of suitable electrically conducting metal oxide particles and/or proppants are those that comprise indium tin oxide, tin oxide, or the like, or a combination comprising at least one of the foregoing metal oxide particles. Examples of suitable intrinsically conducting polymers are polyacetylene and it derivatives, polypyrrole and its derivatives, polyaniline and its derivatives, polythiophene and its derivatives, or the like, or a combination comprising at least one of the foregoing intrinsically conducting polymers. Electrically conducting polymers also include polymers that are mixed with electrically conducting metallic particles, carbonaceous particles, electrically conducting metal oxides, or the like.

It is desirable for the conducting particles and/or proppants to have an electrical resistivity less than or equal to about $10^{12}$ ohm-cm. In one embodiment, the conducting particles and/or proppants have an electrical resistivity less than or equal to about $10^8$ ohm-cm. In another embodiment, the conducting particles and/or proppants have an electrical resistivity less than or equal to about $10^5$ ohm-cm. In yet another embodiment, the conducting particles and/or proppants have an electrical resistivity less than or equal to about $10^3$ ohm-cm.

The semi-conducting particles can comprise silicon, gallium-arsenide, cadmium selenide, cadmium sulfide, zinc sulfide, lead sulfide, indium arsenide, indium antimonide, or the like, or a combination comprising at least one of the foregoing semiconducting particles.

Non-conducting particles and/or proppants include insulating polymers such as those listed above. The non-conducting particles and/or proppants and the semi-conducting particles and/or proppants referred to herein are all at least electrically non-conducting or semi-conducting. Non-conducting particles are also termed dielectric particles. Non-conducting particles or also include inorganic oxides, inorganic carbides, inorganic nitrides, inorganic hydroxides, inorganic oxides having hydroxide coatings, inorganic carbonitrides, inorganic oxynitrides, inorganic borides, inorganic borocarbides, or the like, or a combination comprising at least one of the foregoing inorganic materials. Examples of suitable inorganic materials are metal oxides, metal carbides, metal nitrides, metal hydroxides, metal oxides having hydroxide coatings, metal carbonitrides, metal oxynitrides, metal borides, metal borocarbides, or the like, or a combination comprising at least one of the foregoing inorganic materials. Metallic cations used in the foregoing inorganic materials can be transition metals, alkali metals, alkaline earth metals, rare earth metals, or the like, or a combination comprising at least one of the foregoing metals.

Examples of suitable inorganic oxides include silica ($SiO_2$), alumina ($Al_2O_3$), titania ($TiO_2$), zirconia ($ZrO_2$), ceria ($CeO_2$), manganese oxide ($MnO_2$), zinc oxide ($ZnO$), iron oxides (e.g., $FeO$, $\square\text{-}Fe2O3$, $\gamma\text{-}Fe2O3$, $Fe_3O_4$, or the like), calcium oxide ($CaO$), manganese dioxide ($MnO_2$ and $Mn_3O_4$), or combinations comprising at least one of the foregoing inorganic oxides. Examples of inorganic carbides include silicon carbide (SiC), titanium carbide (TiC), tantalum carbide (TaC), tungsten carbide (WC), hafnium carbide (HfC), or the like, or a combination comprising at least one of the foregoing carbides. Examples of suitable nitrides include silicon nitrides ($Si_3N_4$), titanium nitride (TiN), or the like, or a combination comprising at least one of the foregoing. Examples of suitable borides are lanthanum boride ($LaB_6$), chromium borides (CrB and $CrB_2$), molybdenum borides ($MoB_2$, $Mo_2B_5$ and MoB), tungsten boride ($W_2B_5$), or the like, or combinations comprising at least one of the foregoing borides. Exemplary inorganic substrates are those that comprise naturally occurring or synthetically prepared silica and/or alumina.

Other examples of inorganic materials that can be used in the substrate are silica (sand), aeschynite (rare earth yttrium titanium niobium oxide hydroxide), anatase (titanium oxide), bindheimite (lead antimony oxide hydroxide), bixbyite (manganese iron oxide), brookite (titanium oxide), chrysoberyl (beryllium aluminum oxide), columbite (iron manganese niobium tantalum oxide), corundum (aluminum oxide), cuprite (copper oxide), euxenite (rare earth yttrium niobium tantalum titanium oxide), fergusonite (rare earth iron titanium oxide), hausmannite (manganese oxide), hematite (iron oxide), ilmenite (iron titanium oxide), perovskite (calcium titanium oxide), periclase (magnesium oxide), polycrase (rare earth yttrium titanium niobium tantalum oxide), pseudobrookite (iron titanium oxide), members of the pyrochlore group such as, for example, betafite (rare earths calcium sodium uranium titanium niobium tantalum oxide hydroxide), microlite (calcium sodium tantalum oxide hydroxide fluoride), pyrochlore (sodium calcium niobium oxide hydroxide fluoride), or the like, or a combination comprising at least one of the foregoing pyrochlore group members; ramsdellite (manganese oxide), romanechite (hydrated barium manganese oxide), members of the rutile group, such as, for example, cassiterite (tin oxide), plattnerite (lead oxide), pyrolusite (manganese oxide), rutile (titanium oxide), stishovite (silicon oxide), or the like, or a combination comprising at least one of the foregoing rutile group members; samarskite-(Y) (rare earth yttrium iron titanium oxide), senarmontite (antimony oxide), members of the spinel group such as chromite (iron chromium oxide), franklinite (zinc manganese iron oxide), gahnite (zinc aluminum oxide), magnesiochromite (magnesium chromium oxide), magnetite (iron oxide), and spinel (magnesium aluminum oxide), or the like, or a combination comprising at least one of the foregoing spinel group members; taaffeite (beryllium magnesium aluminum oxide), tantalite (iron manganese tantalum niobium oxide), tapiolite (iron manganese tantalum niobium oxide), uraninite (uranium oxide), valentinite (antimony oxide), zincite (zinc manganese oxide), hydroxides, such as, for example, brucite (magnesium hydroxide), gibbsite (aluminum hydroxide), goethite (iron oxide hydroxide), limonite (hydrated iron oxide hydroxide), manganite (manganese oxide hydroxide), psilomelane (barium manganese oxide hydroxide), romeite (calcium sodium iron manganese antimony titanium oxide hydroxide), stetefeldtite (silver antimony oxide hydroxide), stibiconite (antimony oxide hydroxide), or the like, or a combination comprising at least one of the foregoing inorganic materials.

Non-conducting particles and proppants also include electrically conducting metallic substrates or non-metallic inorganic substrates that are coated with electrically non-conducting polymeric coatings or electrically non-conducting ceramic coatings.

On exemplary class of non-conducting particles and/or proppants include high dielectric constant particles and/or proppants. In one embodiment, the high dielectric constant particles and/or proppants generally comprise an electrically conductive substrate upon which is disposed a coating that has a high dielectric constant. In another embodiment, the high dielectric constant particles and/or proppants generally comprise an inorganic oxide substrate upon which is disposed a coating that has a high dielectric constant. The inorganic oxide substrate may comprise sand or a ceramic. Examples of ceramics are inorganic oxides or metallic oxides and are listed above. The high dielectric particles and/or proppants generally have a dielectric constant of greater than or equal to about 2. Examples of electrically conducting substrates are metallic substrates. Examples of suitable electrically conducting substrates are copper, aluminum, steel, iron, brass, nickel, cobalt, silver, vanadium, or the like, or a combination comprising at least one of the foregoing substrates. Examples of suitable high dielectric materials are solid metal oxide ceramic powders such as, for example, perovskites. Examples of suitable high dielectric materials are lithium tantalum oxide (LiTaO3), lithium niobium oxide (LiNbO3), CaCu3Ti4O12, sintered yttria stabilized zirconia (YSZ), lanthanum strontium gallium magnesium oxide (LSGM), aluminum oxide, tantalum oxide, or the like, or a combination comprising at least one of the foregoing high dielectric materials.

One class of non-conducting particles and/or proppants comprises non-conducting polymeric substrates that have filler dispersed in the particle. The non-conducting filler can comprise non-metallic inorganic particles, naturally occurring organic particles such as ground or crushed nut shells, ground or crushed seed shells, ground or crushed fruit pits, processed wood, ground or crushed animal bones; synthetically prepared organic particles, or the like, or a combination comprising at least one of the naturally occurring particles.

Another class of non-conducting particles are granules comprising a porous glass or ceramics that can absorb electromagnetic radiation incident upon them. Suitable granules can comprise a ferrite such as nickel-zinc or barium-ferrite, wherein the mass of carbon to ferrite is greater than 0.225. Examples of such materials are described in patent/patent application WO 02/13311. These granules have an average particle diameter of 0.2 to 4.0 millimeters. The total porosity is about 70 to about 80 volume percent. The bulk density if about 0.5 to about 0.8 grams per cubic centimeter.

Examples of suitable ground or crushed shells are shells of nuts such as walnut, pecan, almond, ivory nut, brazil nut, ground nut (peanuts), pine nut, cashew nut, sunflower seed, Filbert nuts (hazel nuts), macadamia nuts, soy nuts, pistachio nuts, pumpkin seed, or the like, or a combination comprising at least one of the foregoing nuts. Examples of suitable ground or crushed seed shells (including fruit pits) are seeds of fruits such as plum, peach, cherry, apricot, olive, mango, jackfruit, guava, custard apples, pomegranates, watermelon, ground or crushed seed shells of other plants such as maize (e.g., corn cobs or corn kernels), wheat, rice, jowar, or the like, or a combination comprising one of the foregoing processed wood materials such as, for example, those derived from woods such as oak, hickory, walnut, poplar, mahogany, including such woods that have been processed by grinding, chipping, or other form of particalization.

The particles can have any desirable geometry and any desirable particle size distribution. The particle geometry can be platelet like, spherical, spheroidal, cuboid, conical, cylindrical, tubular, polygonal, or the like, or a combination comprising at least one of the foregoing geometries. The particles can have aspect ratios of greater than or equal to about 1. The aspect ratio as defined herein is the ratio of the largest dimension to the smallest dimension of the particle. In one embodiment, it is desirable to have an aspect ratio of greater than or equal to about 5. In another embodiment, it is desirable to have an aspect ratio of greater than or equal to about 50. In yet another, embodiment it is desirable to have an aspect ratio of greater than or equal to about 100.

In one embodiment, as noted above, the particles and/or proppants can be modified after being introduced into the fracture. For example, electrically non-conducting particles and/or proppants can be reacted after introduction into the fracture to form electrically conducting or semi-conducting particles and/or proppants. In one embodiment, the electrically non-conducting particles can be disposed upon a support prior to introduction into the fracture. The support can be a proppant, a porous inorganic substrate, an organic substrate, a fiber, or the like. In one embodiment, the electrically non-conducting particles can be coated onto the support and can exist in the form of a continuous coating upon the support. In another embodiment, the electrically non-conducting particles can form discrete particles on the support. After introduction into the fracture, the reaction converts the electrically non-conducting particles into electrically conducting or semi-conducting particles.

The reaction can involve oxidation, reduction, or other reaction mechanisms that are employed in the field of chemistry. For example, a non-conducting particle comprising aluminum nitrate can be reduced to form aluminum, by reacting it with a gaseous composition comprising hydrogen. The aluminum can be deposited on the walls of the fracture and can serve to reflect incident electromagnetic radiation. The reflected radiation can then be analyzed to provide information about the geometry of the fracture.

Examples of electrically non-conducting particles are metal salts such as metal sulfates, metal nitrates, metal chlorides, metal chlorates, metal fluorides, metal hydroxides, metal iodides, metal hydroxides, metal carbonates, metal acetates, metal bromides, or the like. The electrically non-conducting particles can be reacted with a gaseous or liquid reactant to form an electrically conducting particle. The reactants can be contained in the fracturing fluid or can be added to the fracture independent of the fracture fluid to facilitate the reaction. The fracture temperature, which is about 100 to about 250° C. can facilitate the reaction. Examples of suitable metal salts are aluminum nitrate, copper sulfate, copper nitrate, or the like, or a combination comprising at least one of the foregoing.

It is desirable for the smallest dimension of the particle to be on the order of 0.1 nanometers or greater. In another embodiment, the smallest dimension of the particle can be on the order of 10 nanometers or greater. In yet another embodiment, the smallest dimension of the particle can be on the order of 100 nanometers or greater. In yet another embodiment, the smallest dimension of the particle can be on the order of 1000 nanometers or greater.

The particles can also be assembled into networks, aggregates, agglomerates, networks of agglomerates, or the like, or a combination comprising at least one of the foregoing assemblies of particles. A network is a collection of particles having a particular order. Examples of networks are weaves, textiles, meshes, plies, or the like, or a combination comprising at least one of the foregoing networks. These networks can be formed prior to the introduction of the particles into the fracture either through self-assembly or because of deliberate construction.

Alternatively, these networks can be formed after introduction of the particles into the fracture by self-assembly. Magnetic particles and/or magnetizable particles can self assemble into such networks after introduction into the fracture. Suitable stimulus may be applied to the particles after introduction into the fracture in order to facilitate self-assembly. An example of a suitable stimulus is an electric field or a magnetic field.

Aggregates are generally formed by particles assembling together as a result of mechanical entanglements or because of hydrogen bonding, ionic bonding, Van der Waals forces, or combinations of the foregoing forces. Clusters of aggregates form agglomerates. Both aggregates and agglomerates of particles can be used for imaging the fracture. Agglomerates can also form networks in conjunction with aggregates or individual particles. Such structures are termed networks of agglomerates. Networks of agglomerates can also be formed by self-assembly if desired.

In one embodiment, it is desirable for at least a portion of the electrically conducting, the semi-conducting or the non-conducting particles and/or proppants to adhere to the walls of the fracture or the end of the fracture. This permits the particles to reflect electromagnetic radiation signals that are transmitted or propagated down the fracture. In order to permit the particles to adhere to the walls of the fracture, it may be desirable to coat a portion of the particles with a thermoplastic or thermosetting polymer that has a glass transition temperature lower than the temperature of the fracture. The polymer will promote adhesion of the particles to the walls of the fracture.

In another embodiment, the fracturing fluid into which the particles are suspended may contain an adhesive that promotes the adhesion of the particles to the walls of the fracture. This will be discussed in detail later.

The conducting particles, non-conducting particles and/or semi-conducting particles are introduced into the fracture either simultaneously or sequentially in a fracturing fluid. An example of a suitable fracture fluid is one that comprises water, salt up to about 2 weight percent potassium chloride, a water soluble polymer, a crosslinker, a pH control additive (also termed a buffer), a surfactant to reduce tension, the particles (additives and/or fillers) and a viscosity control additive.

Water can be replace by a foam, an oil based fluid (e.g., a paraffin oil), or an emulsion. When water is used, an exemplary water-soluble polymer is guar gum that is used in an amount of 0.1 to about 3 wt % based on the total weight of water. Calcium carbonate is a suitable buffer when water is employed. Cross-linkers include borates, titanium, zirconium or aluminum compounds. As noted above, the fracturing fluid can contain an adhesive that facilitates adhesion of the electrically conducting particles, the semi-conducting particles or the non-conducting particles to the walls of the fracture. When water is used as the base for the fracture fluid, it may be desirable to introduce a water based adhesives into the fracture fluid. The adhesive can adhere to the walls permitting the target and secondary particles to adhere to the walls of the fracture.

In one embodiment, the fracturing fluid can comprise reactants for facilitating the conversion of electrically non-conducting particles and/or proppants into electrically conducting particles and/or semi-conducting particles. Suitable reactants can be catalysts, acids, bases, or the like. The reactants are generally present in a concentration effective to convert at least a portion of the electrically non-conducting particles and/or proppants into electrically conducting or semi-conducting particles and/or proppants.

Suitable adhesives for water based fracture fluids are acrylic polymers, cellulosic polymers, polymer emulsions, copolymer emulsions, or the like. When oil based fluids are used in the fracture fluids, it is desirable to use adhesives that are compatible with the oil base. Examples of suitable adhesives that can be used with oil based fracture fluids are epoxy resins, phenolic resins, butadiene based polymers, isoprene based polymers, or the like.

In one embodiment, in one manner of introducing the particles and/or proppants into the fracture, it is desirable to first introduce electrically conducting particles and/or proppants into the fracture -followed by the introduction of high dielectric constant proppants. As noted above, the particles and/or proppants can be introduced into the fracture along with a fracture fluid. In one embodiment, it is desirable for the conducting particles to comprise particles having high aspect ratios (e.g., fibers) as well as particles having low aspect ratios (e.g., spherical particles). In another embodiment, all of the particles introduced into the fracture can have a uniform aspect ratio. The particles can advantageously form an electrically conducting network along the walls of the fracture by adhering to the walls of the fracture. An exemplary electrically conducting network is a percolating network, i.e., one where the network has continuous electrical contact along the walls of the fracture. The conducting proppants can serve to prop open the fracture in addition to facilitating the reflection/transmission of the electromagnetic radiation signal. The high dielectric constant proppants can be used to facilitate waveguiding along the length of the fracture.

In another embodiment, following the introduction of the conducting particles into the fracture, proppants that are transparent to electromagnetic radiation signals (e.g., electrically non-conducting particles) are introduced into the fracture to prop the fracture. Since these proppants are transparent to electromagnetic radiation signals, they permit the signals to travel through them without any attenuation. This combination of conducting particles and/or proppants along the walls of the fracture together with non-conducting particles lodged in the middle of the fracture will permit the incident electromagnetic radiation signal to propagate down the fracture by being reflected off the conducting particles located along the walls of the fracture. The conducting particles located along the walls form a waveguide thereby facilitating the electromagnetic radiation signal to travel down the fracture. The signal is then reflected from the particles located at the end of the fracture. The particles located at the end of the fracture (i.e., the end of the fracture is located farthest from the bore hole) are generally termed target particles. The signal upon reflection from the target particles can be collected in the receiver and analyzed in a computer to gather and/or deduce information about the fracture geometry.

In another embodiment, in another method of determining the fracture geometry, a first set of conducting particles having a first set of electrical conductivity characteristics are introduced into the fracture. The first set of conducting particles will form the target particles. A second set of conducting particles having a second set of electrical characteristics is then introduced into the fracture. In one embodiment, following the introduction of the first set and second set of conducting particles into the fracture, proppants that are transparent to electromagnetic radiation signals (e.g., electrically non-conducting particles) may optionally be introduced into the fracture to prop the fracture. In another embodiment, following the introduction of the first set and second set of conducting particles into the fracture, high dielectric constant proppants that can act as a waveguide for the electromagnetic radiation signals (e.g., electrically non-conducting particles)

may optionally be introduced into the fracture to prop the fracture while guiding the incident and reflected radiation.

A series of incident electromagnetic radiation signals are then transmitted into the fracture from the logging tool 20. The reflection signatures from the first set of conducting particles will be different from those of the second set of conducting particles. The reflection from the first set of conducting particles can be used to determine the length of the fracture, while the reflection from the second set of conducting particles may be used to provide additional information about the geometry of the fracture. In another embodiment, the differences between the first and the second set of reflections can be used to obtain information about the fracture geometry.

In yet another embodiment, in another method of determining the fracture geometry, non-conducting particles that will completely absorb/attenuate the electromagnetic radiation signal are first introduced into the fracture. The non-conducting particles will settle at the end of the fracture, i.e., they will be located as the farthest end of the fracture from the bore hole. Immediately after introducing the non-conducting particles into the fracture, electrically conducting particles are introduced into the fracture. Both the non-conducting and the electrically conducting particles may serve as proppants in addition to interacting with the electromagnetic radiation signal. Following the introduction of the first set and second set of conducting particles into the fracture, particles that are transparent to electromagnetic radiation signals (e.g., electrically non-conducting particles) may optionally be introduced into the fracture to prop the fracture if desired. A series of incident electromagnetic radiation signals are then transmitted into the fracture from the logging tool 20. There will be no reflection signatures from the first set of particles since they are completely absorbing, while there will be different signals from those of the second set of particles since they are electrically conducting. The difference in signals can be used to obtain information about the fracture geometry.

As noted above, the logging tool 20, comprises a transmitting element and a receiving element. The combination of the transmitter and the receiver is termed a transceiver. The transmitting element is capable of transmitting electromagnetic radiation signals at frequencies ranges from about 300 MHz to about 100 GHz, or any portion thereof. In one embodiment, the signals can be transmitted into the fracture without pulsing. In another embodiment, the signals can be sequentially pulsed into the fracture. This method relies on pulsed electromagnetic radiation to characterize a fracture's geometry as a function of distance from the transceiver. The technique of using pulsed frequencies has the advantage of providing multipath immunity and very high range resolution. A typical electromagnetic radiation pulse has a duration of only 1 to 2 nanoseconds. The spectral content of the radiated pulse is determined by the natural frequency response of the transmitting antenna but often exceeds 1GHz. The electromagnetic radiation pulses themselves are created by means of a "Pulser Circuit" utilizing differential input switches, delay lines, step recovery diodes and impulse filters. A common type of electromagnetic radiation pulse is a Gaussian monocycle that resembles a smoothly shaped single-cycle sine wave. As noted above, the electromagnetic radiation will be guided in the fracture by suitably chosen particles.

In another embodiment, the electromagnetic radiation can comprise spread spectrum continuous wave signals. The peak to average power ratio of continuous wave signals is low, which permits the emission of electromagnetic radiation signals downhole with one a fiber optic cable and a photodiode.

As the fracture width (the separation of the walls of the fracture is termed the width) narrows, energy from the electromagnetic radiation pulse will be returned and the spectral content of the returned pulse will carry useful geometric information that will be used to characterize the fracture. Many detection schemes are possible. It may be advantageous for example to monitor the returned energy in a narrow band as a function of time (frequency domain) or accurate data may be achieved by high-resolution sampling in a very narrow time window and moving the window over subsequent pulses to map out the response (time domain). Interferometric synthetic aperture radar (SAR) techniques may also be employed to utilize valuable phase information as the antenna is moved up and down in the wellbore, Finally, it may be advantageous to employ multiple frequency band pulses, using different antennas to be able to map the response over a very large frequency band. In one embodiment, the logging tool may employ more than one antenna along with the associated circuitry that allows the use of multiple frequencies to screen and to determine the geometry of the fracture. In another embodiment, the logging tool may employ a variable antenna to permit the transmission and receipt of frequencies having a large range in wavelength sizes.

In one embodiment, electromagnetic radiation having different frequencies may be emitted into the fracture. By introducing into the fracture a variety of proppants having differing responses to different frequencies, information about the geometry of the fracture can be determined. For example, a proppant that absorbs electromagnetic radiation at one frequency can be transparent to the radiation at another frequency. In another example, a proppant that absorbs electromagnetic radiation at one frequency can be transparent to the radiation of the same frequency at another temperature.

Power to the logging tool may either be supplied from the surface or by batteries included with the well-bore transceiver. Data may either be transmitted to the surface via a fiber optic link, a coaxial cable, or may be recorded on magnetic or flash media down-hole. Characterization techniques will include standard signal processing techniques for interpreting the time domain data or frequency domain data received by the detector circuits. Radio frequency power is generated directly from the modulated laser beam. The bias voltages that we use are to optimally bias the diodes, and in some cases, it may not be desirable or necessary.

The method is advantageous in that it does not use radioactive materials that can contaminate underground aquifers or disturb the environment. In addition, determination of the fracture geometry is very valuable for improving production of oil and natural gas. Further, knowledge (and therefore control) of the geometric aspects of a fracture carries broad economic and commercial implications since a proper fracture is required for efficient oil production.

In one embodiment, information generated about the fracture by the aforementioned technique can be advantageously used to improve fracturing techniques during the performance of subsequent fractures in a given formation. The information obtained about the fracture provides a novel and improved optimization process for well completions in general and for fracturing treatments in particular. This process is to optimize the materials used (fluid, proppant, breakers, etc.) in the fracturing treatment as well as the height, length and width of the fracture to achieve the optimized fracture treatment based on the desired economic drivers. The stresses within the oil or gas bearing formation as well as the surrounding formations control the geometry of the fracture created. These stresses will determine the geometry of the fracture and can be modeled in a 3-D fracture simulator and this geometry is useful for optimizing the fracture treatment.

In another embodiment, the methods of the present invention may be utilized to verify or optimize formation models, such as 3-D fracture models and treatment design programs. Instead of starting with various fracturing materials based on some individual's personal knowledge or preferences and running simulations and economic analyses to project possible resulting production and cost, the present invention starts by determining a fracture geometry profile for the given reservoir that has been fractured. The fracture geometry profile can be utilized in connection with other production data to produce a conductivity profile. Once the conductivity profile, for a constant pressure drop down the fracture, is determined for the given reservoir conditions, along with any other losses like multi-phase flow or gel damage, the materials needed to obtain this conductivity profile are determined by the respective material's performance and economics. The materials selected are based on their ability to meet the conductivity objective and their rank based on economic value to the fracture conductivity objective (for example, proppant judged on strength and cost/conductivity for given reservoir conditions, stress, temperature, etc.). In this way unsuitable materials are eliminated early in the analysis so that the materials to evaluate in the desired design are only those capable of achieving the final conductivity goal in an economical manner. Whereas a prior approach might result in a very large number of combinations of materials to evaluate to achieve the desired results by trial and error, this new approach significantly reduces the combinations of materials for the design process and ensures that the materials in the evaluation process are only those that should be considered for the reservoir conditions. This ensures that the final simulations use the technically appropriate materials and are the best value materials for the desired conductivity objectives. The theoretical length desired for the formation to be stimulated should be verified by the methods of the present invention to optimize fracture. This new approach can reduce the iterations required to optimize a fracturing treatment and significantly reduce the redesign process at the well site.

Accordingly, the present invention can be defined as a computer-aided fracturing and well completion method, comprising: performing tests using electromagnetic radiation signals on a subterranean well to obtain data about the fracture geometry, and entering the data into a computer; determining, in the computer and in response to the data, an initial desired fracture length and conductivity for a fracture to be formed in at least one earthen formation traversed by the well; determining, in the computer and in response to the data and the initial desired fracture length and conductivity, a proppant and a fracturing fluid proposed to be pumped into the well to fracture the earthen formation; determining, in the computer, a treatment schedule for pumping the fluid and the proppant into the well; and pumping fluid and proppant into the well in accordance with at least part of the treatment schedule. This method can further comprise: measuring, in real time while pumping fluid and proppant, downhole parameters in the well; modifying, in the computer and in response to the measured downhole parameters, the treatment schedule; and continuing the pumping of fluid and proppant in accordance with the modified treatment schedule.

In one embodiment, a method of completing a well to provide a desired hydrocarbon productivity, comprises logging the well to obtain data used in measuring physical and mechanical properties of a subterranean formation traversed by the well; entering the data into a computer; using the data and predetermined production increase curves encoded into signals stored in the computer, defining in the computer a desired fracture length; determining, in the computer and in response to entered data, an expected fracture width; determining, in the computer and in response to the desired fracture length and expected fracture width, a desired proppant deposition; determining, in the computer and in response to predetermined data stored in the computer, a required proppant concentration; determining, in the computer and in response to entered data, a temperature in the well; determining, in the computer and in response to the determined temperature, a fracturing fluid to be pumped into the well for fracturing; running, in the computer, a reservoir simulation program and an economics model program using the determined proppant and fluid to determine a desired treatment schedule for pumping fluid and proppant into the well; and pumping fluid and proppant into the well in accordance with the treatment schedule. This can further comprise obtaining further data about the well while pumping fluid and proppant, and modifying the treatment schedule in real time so that the pumping continues in accordance with the modified treatment schedule.

In another embodiment, a method of defining a fracturing treatment for a well, comprises storing physical property data about a selected well in a computer also having stored therein data defining predetermined production increase relationships and predetermined proppant deposition and concentration relationships; operating the computer to automatically output, in response to the physical property data and the data defining production increase relationships and predetermined proppant deposition and concentration relationships, data defining a proposed fracture treatment schedule including a proposed proppant and fluid system; testing the proposed fracture treatment schedule in a fracture modeling program stored in the computer; and performing in the computer an economic analysis of the proposed fracture treatment schedule. This can further comprise: repeating the steps of operating, testing and performing with regard to defining at least one other fracture treatment schedule; and selecting one of the fracture treatment schedules to guide a fracturing treatment applied to the selected well.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

We claim

1. A method of determining the fracture geometry of a subterranean fracture comprising:
   introducing into the fracture an electrically non-conducting target particle and/or proppant;
   transmitting into the fracture electromagnetic radiation having a frequency of about 300 megahertz to about 100 gigahertz; and
   analyzing a returned electromagnetic signal, for reflected or absorbed waves, from the target particle and/or a fracture surface to determine fracture geometry.

2. The method of claim 1, wherein the target particle and/or proppant occupies a position at the end of the fracture or the end of a branch emanating from the fracture.

3. The method of claim 1, wherein the target particles and/or proppant comprise a high dielectric constant particle and/or proppant having a dielectric constant greater than or equal to about 2.

4. The method of claim 3, wherein the high dielectric constant particle and/or proppant comprise a metal substrate upon which is disposed a ceramic coating; wherein the ceramic coating has a dielectric constant greater than or equal to about 2.

5. The method of claim 4, wherein the metal substrate comprises copper, aluminum, steel, iron, brass, nickel, vanadium, cobalt, silver, or a combination comprising at least one of the foregoing metals.

6. The method of claim 4, wherein the ceramic comprises perovskites.

7. The method of claim 4, wherein the ceramic comprises lithium tantalum oxide ($LiTaO_3$), lithium niobium oxide ($LiNbO_3$), $CaCu_3Ti_4O_{12}$ sintered yttria stabilized zirconia (YSZ), lanthanum strontium gallium magnesium oxide (LSGM), aluminum oxide, tantalum oxide, or a combination comprising at least one of the foregoing ceramics.

8. The method of claim 3, wherein the high dielectric constant particle comprises a ceramic having a dielectric constant greater than or equal to about 2.

9. The method of claim 1, wherein the target particles and/or proppant comprise a high dielectric constant particle and/or proppant having a dielectric constant greater than or equal to about 6.

10. The method of claim 1, wherein the electromagnetic radiation has a frequency of about 300 megahertz to about 3 gigahertz.

11. A method of determining the fracture geometry of a subterranean fracture comprising:

introducing into the fracture an electrically non-conducting target particle and/or proppant; wherein the target particle and/or proppant comprises a high dielectric constant ceramic having a dielectric constant of greater than or equal to about 2;

transmitting into the fracture electromagnetic radiation having a frequency of less than or equal to about 3 gigahertz; and     analyzing a returned electromagnetic signal, for reflected or absorbed waves, from the target particle to determine fracture geometry.

12. The method of claim 11, wherein the target particles and/or proppant comprise a high dielectric constant ceramic having a dielectric constant greater than or equal to about 6.

13. The method of claim 11, wherein the target particle and/or proppant comprise a metal substrate upon which is disposed a ceramic coating; wherein the ceramic coating has a dielectric constant greater than or equal to about 20.

14. The method of claim 13, wherein the metal substrate comprises copper, aluminum, steel, iron, brass, nickel, vanadium, cobalt, silver, or a combination comprising at least one of the foregoing metals.

15. The method of claim 11, wherein the high dielectric constant ceramic comprises perovskites.

16. The method of claim 11, wherein the high dielectric constant ceramic comprises lithium tantalum oxide ($LiTaO_3$), lithium niobium oxide ($LiNbO_3$), $CaCu_3Ti_4O_{12}$, sintered yttria stabilized zirconia (YSZ), lanthanum strontium gallium magnesium oxide (LSGM), aluminum oxide, tantalum oxide, or a combination comprising at least one of the foregoing ceramics.

17. The method of claim 11, wherein the electromagnetic radiation has a frequency of less than or equal to about 1 gigahertz.

\* \* \* \* \*